(No Model.)
2 Sheets—Sheet 1.
F. W. CLOUGH.
GEARING.
No. 329,721.
Patented Nov. 3, 1885.
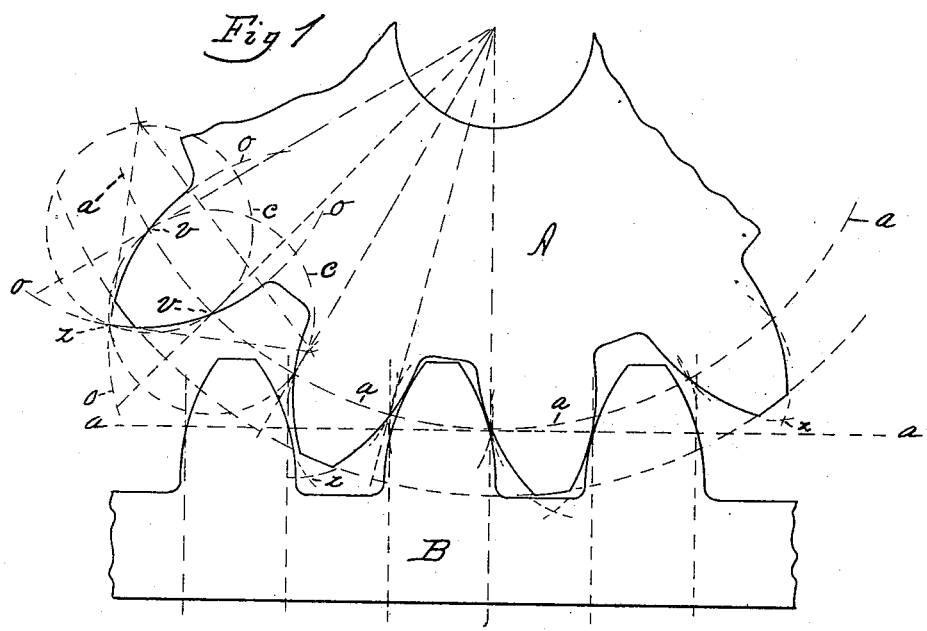
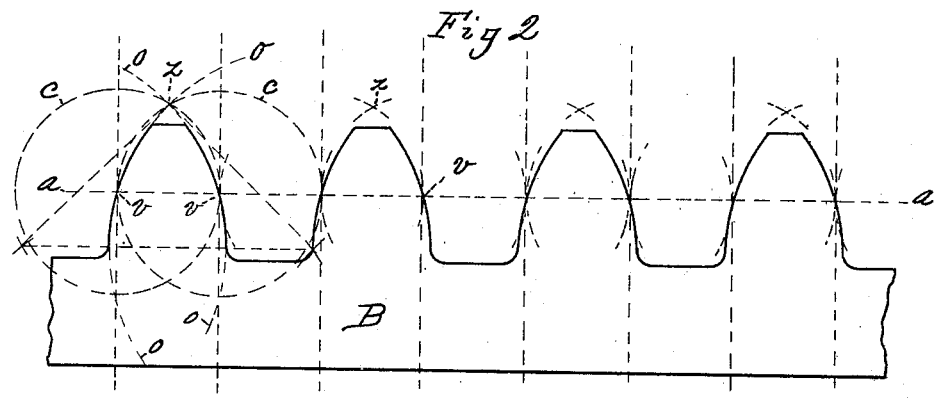
WITNESSES:
INVENTOR
Francis W. Clough
BY
Henry A. Chapin
ATTORNEY (No Model.) 2 Sheets—Sheet 2.
F. W. CLOUGH.
GEARING.
No. 329,721. Patented Nov. 3, 1885.
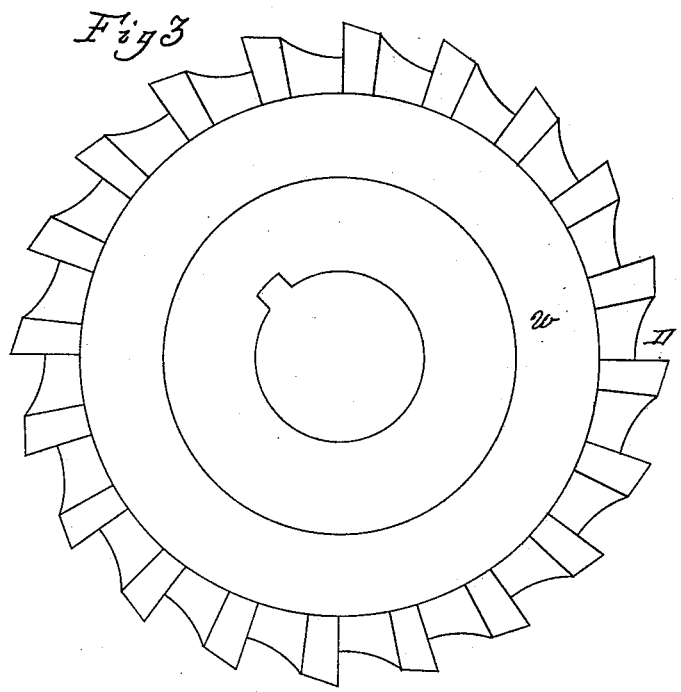
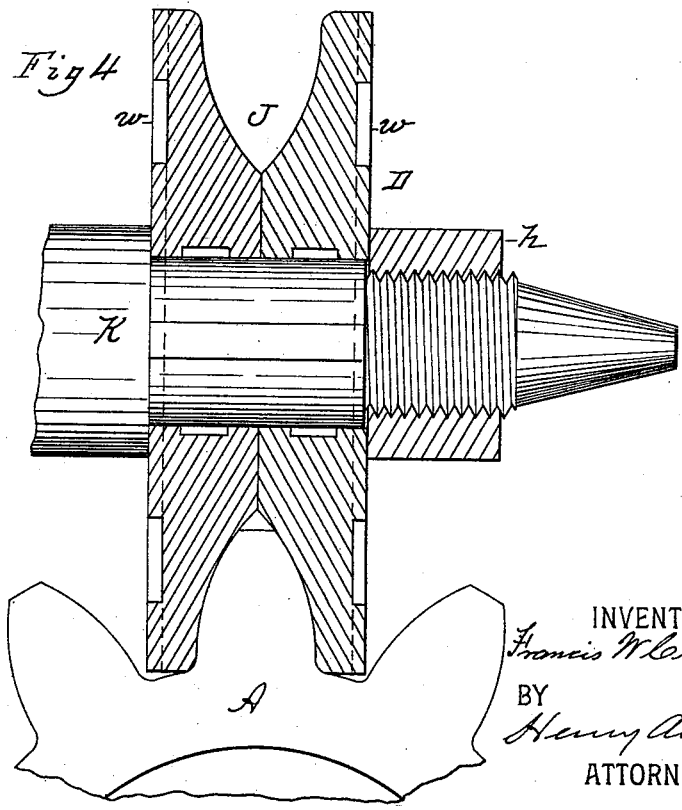
WITNESSES:
INVENTOR
Francis W. Clough
BY
Henry A. Chapin
ATTORNEY

UNITED STATES PATENT OFFICE.

FRANCIS W. CLOUGH, OF SPRINGFIELD, MASSACHUSETTS.

GEARING.

SPECIFICATION forming part of Letters Patent No. 329,721, dated November 3, 1885.

Application filed September 21, 1885. Serial No. 177,634. (No model.)

*To all whom it may concern:*

Be it known that I, FRANCIS W. CLOUGH, a citizen of the United States, residing at Springfield, in the county of Hampden and State of Massachusetts, have invented new and useful Improvements in Gearing, of which the following is a specification.

This invention relates to improvements in gearing, the object being to provide a standard tooth for all diameters of gears of the same pitch, whereby lost motion between gear-wheels of different diameters and between a rack and pinions of varying diameters is obviated and perfect matching or contact of the teeth of gears or racks with pinions of different diameters is secured, the entire variation, if any there be, being thrown into the spaces between the teeth.

In the drawings forming part of this specification, Figure 1 is a side view of a segment of a gear-wheel and a portion of a rack having teeth thereon constructed according to my invention. Fig. 2 is a side view of a portion of a rack similar to that shown in Fig. 1, but separate from a gear-wheel, both of said figures having thereon a series of dotted lines, which are hereinafter fully explained, indicating the manner of laying out the teeth of the gearing. Fig. 3 is a side elevation of a cutter-wheel used in making said gears; and Fig. 4 is a transverse section of said cutter-wheel, shown mounted on the end of a mandrel on which it is operated in an ordinary gear-cutting machine, a segment of a gear being shown under the cutter-wheel.

In the drawings, A is the gear, and B is the rack.

In carrying out my invention I construct the teeth of a gear with their crest sides of such a curved form that they involve no change in the shape of the teeth between a rack and any sized pinion, but the entire variation is thrown into the spaces above and below the pitch-line in such a way that it involves no lost motion, because the spread of the teeth at the pitch-line remains the same and provides for the perfect matching of pinions of different diameters with the same rack, or of pinions of different diameters with each other. By said means a standard tooth is produced for all sizes of gears of the same pitch. By "same pitch" is meant the same number of teeth relative to the diameter, as a twelve-inch gear with thirty-six teeth, or a six-inch gear with eighteen teeth, three to the inch of diameter, and so on.

To arrive at the above-mentioned result I lay out the teeth of a gear in the following manner: I first draw or strike a pitch-line for either a rack or a gear, as the case may be. For instance, for a six-inch gear I draw a pitch-line, $a$, having a three-inch radius, and then divide said line into equal divisions for teeth and spaces. Then to delineate the desired shape of the tooth an equal subdivision of the pitch-line is made, dividing it into as many parts as there are to be spaces and teeth, as twenty-four subdivisions on a gear of six-inch diameter, and having done this, I determine (as being the best but not the only practical proportion) the length of the tooth by making it two-thirds of the length of two of said subdivisions on the pitch-line—as, for instance, two of said subdivisions measuring one and one-half inch, the length of the tooth will be one inch.

To obtain the proper curve on the crest sides of the tooth, wherein consists an important feature of my improvement, I adjust a pair of dividers to a radius equal to one of said subdivisions, or, in this case, three-quarters of an inch, or approximately so, (fractions omitted,) and then strike a circle from each side of a space on the pitch-line $a$, said circles $c$, drawn from the pitch-line point on the side of the tooth, intersecting above the latter at $z$, and being of a diameter equal to two of said subdivisions, or one and one-half inch. The points of intersection of the circles $c\ c$ with the pitch-line $a$ indicate the position of the crests of the tooth on opposite sides thereof. The dividers are then set to a radius equal to twice the thickness of the tooth, or equal to a tooth and a space, (see circles $c$,) and their position is then adjusted to draw two segments of circles, $o\ o$, which intersect with the pitch-line or crest of the tooth at $v$, and conjointly with the above-mentioned circles $c\ c$ at $z$, beyond the end of the tooth, and the curve-line of the side of the tooth from its crest $v$ to its end is a part of the segment $o$ between the said pitch-line and said point of intersection $z$ above or beyond the end of the tooth, the end of the latter in practice not being extended quite to said point $z$. The curve of the side of the tooth below the crest $v$ or pitch-line is that of the segment $o$.

The hereinbefore-described gears are made by the employment of a cutter, D, such as is shown in Figs. 3 and 4, which cutter is circular, and is made in two parts, as shown, and is properly secured on the mandrel K. Said cutter parts are so formed that when they are secured side by side on said mandrel they form a cutter-wheel having a groove, J, in its periphery, provided with cutting-teeth of the usual form on its surface, the latter extending across the peripheries of said parts, as shown in Fig. 3, and on the outside of the latter a certain distance toward the center. A clearance-groove, $w$, is formed on the outer sides of the cutter, and the latter is secured on the mandrel K by the nut $h$, as shown. Said groove J in the cutter-wheel has such a form in cross-section as it is desired to give to the gear-teeth. Said cutter, unlike those ordinarily used for cutting gears, (being placed in a suitable gear-cutting machine,) cuts the teeth one after the other, and, incidentally, a part of the spaces between the tooth and the adjoining ones each side thereof, and not, as has been heretofore done, an entire space between the teeth at each cut and the adjoining sides of two teeth. Thus the teeth are all uniformly of the contour of the said groove in the cutter, and if there is any variation in the positions of the teeth on the gear so cut it arises from imperfections in the index parts of the gear-cutter, and said variations are thrown into the spaces between the teeth.

What I claim as my invention is—

1. A gear-tooth having its crest sides in the form of segments of circles, which circles intersect at a point above the tooth conjointly with the lines of circles having the pitch-line point each side of the tooth for their centers, substantially as set forth.

2. A gear having teeth whose crest sides are made on a regular curve from their bases to their extremities, the lines of which curves, when extended beyond the end of the teeth, intersect at a point central between said sides thereof.

FRANCIS W. CLOUGH.

Witnesses:
H. A. CHAPIN,
W. F. RICE.